3,497,527
ANTHRAQUINONE DYESTUFFS
David I. Randall and Harlan B. Freyermuth, Easton, Pa., assignors to GAF Corporation, New York, N.Y., a corporation of Delaware
No Drawing. Filed Dec. 5, 1966, Ser. No. 598,903
Int. Cl. C09b 1/50
U.S. Cl. 260—326.5                 3 Claims

ABSTRACT OF THE DISCLOSURE

Anthraquinone dyestuffs of improved fastness to sublimation and affinity for synthetic and natural fibers are prepared, having in the 1-position of the Aq nucleus an —OH, —NH$_2$, or —NH lower alkyl group; at least one of the positions 2 and 4 being substituted by the grouping

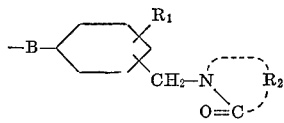

wherein B represents —O— or

R$_1$ represents hydrogen, lower alkyl and lower alkoxy and R$_2$ represents an alkylene radical of from 3 to 5 carbon atoms necessary to complete a 5 to 7 membered heterocyclic ring of the lactam series, the 2 and 4 being otherwise unsubstituted, or if otherwise substituted in the 2-position by lower alkoxy or halogen, or in the 4-position by a —NH lower alkyl group or an —OH group.

---

The present invention relates to organic dyestuffs and more particularly to dyestuffs of the anthraquinone series having exceptional fastness to sublimation, resistance to heat, light, moisture, gas, etc., and characterized by having outstanding brightness, clarity of shade, etc.

Many of the currently available dyestuffs of the anthraquinone series which have heretofore enjoyed a considerable measure of commercial acceptance have nevertheless been found to be somewhat deficient in one or more of the properties considered desirable if not essential in a commercially feasible dye product. Among the more notable deficiencies found to characterize the available anthraquinone dyestuffs, there may be mentioned, for example, their poor sublimation fastness, their relatively limited affinity for a considerable number of the fibrous materials currently in widespread use whether of synthetic or natural orgin, including blends thereof; inferior resistance to the effects of continued exposure to light, heat, moisture, gas and the like; lack of brightness and clarity of shade, etc. The effects of the foregoing problems have become particularly manifest in connection with dyeings of fibrous materials constituted in whole or in part of polymeric materials such as polyesters, polyamides, cellulose esters, e.g., cellulose acetate, cellulose acetate butyrate and the like, available commercially under such trade names as Acrilan, nylon, orlon, Dacron, Dynel and the like. Commercial fibers based on the foregoing materials have, of course, attained considerable commercial importance. However, the selection of dyestuffs available for effective use therewith remains somewhat limited despite the efforts heretofore expanded in attempting to provide suitable coloring agents which would meet commercial requirements. Various procedures have been suggested in the prior art by which one or more of the above-mentioned dye deficiencies have been overcome or otherwise mitigated. For example, it has been suggested to modify the dyestuff molecule by attaching thereto certain substituent groups in order to enchance fastness properties, substantivity, brightness and the like. Moreover, it has also been suggested to modify the chemical and/or physical characteristics of the fibrous material itself by some suitable pre-treatment technique whereby the dye receptivity thereof is enhanced or extended to the extent of permitting dyeings by colorants not normally substantive thereto. However, the advantages provided by the foregoing manipulative techniques have nevertheless been found to leave considerable room for improvement with respect to one or more of the properties mentioned hereinbefore, i.e., fastness to the effects of light, heat, moisture, gas and the like.

Thus, a primary object of the present invention resides in the provision of novel dyestuffs of the anthraquinone series which are not subject to one or more of the above disadvantages.

A further object of the present invention resides in the provision of novel dyestuffs of the anthraquinone series characterized by outstanding sublimation fastness, affinity for fibrous materials of natural and/or synthetic origin, brightness, clarity of shade, and the like.

Other objects and advantages of the present invention will be made apparent from the following description.

The attainment of the above objects is made possible by the present invention which in its broader aspects includes the provision of novel anthraquinone dyestuffs of the following general formula:

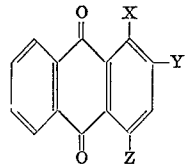

wherein X represents —NHR or —OH; wherein R represents hydrogen or lower alkyl of from 1 to 4 carbon atoms, e.g., methyl, ethyl, propyl, isopropyl, etc.; Y represents hydrogen, lower alkoxy or halogen, e.g., chlorine or bromine; Z represents hydrogen, —OH or —NHR with the proviso that at least one of Y and Z represent the grouping:

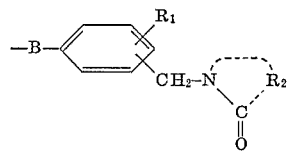

wherein B represents —O— or

R$_1$ represents hydrogen, lower alkyl or lower alkoxy; and R$_2$ represents the carbon atoms necessary to complete a 5 to 7 membered heterocycle of the lactam series.

The dyestuff materials included within the ambit of the above-depicted structural formula exhibit an exceptional degree of sublimation fastness, i.e., fiber materials dyed therewith retain their color saturation, purity of hue, etc., despite subjection to extreme conditions of heat, light and humidity. The tendency of a given dyestuff to sublimate, i.e., volatilization can be evaluated according to well known and standardized testing techniques devised for such purposes. In any event, and regardless of the particular method employed, the data obtained serves as indicia which afford a qualitative as well as quantitative assessment of given dye properties under a wide range of conditions. Thus, it is well known that a large number of commercially available dyestuffs and especially of the anthraquinone series, invariably stain other fabrics placed in contact therewith as a result of the fugitive dye transfer, such problems becoming more pronounced under hot, pressing conditions. As will be readily obvious, dyestuff products found to be so defective are substantially unsuitable as colorants for fabrics which would, in all probability, be exposed to the aforedescribed conditions. Dyestuff sublimation would also be manifested by a loss of color saturation in the fabric upon standing despite even moderate conditions of heat and humidity.

However, in accordance with the present invention, it is found that anthraquinone dyestuffs of the above described formula, i.e., those containing the lactam alkyl moiety, are characterized not only by outstanding sublimation fastness but also by significantly improved light fastness, brilliance and saturation of hue and the like and especially when applied to such commercial fabric materials as polyester, polyamide, cellulose, etc.

The dyestuffs of the present invention may be readily and conveniently prepared by the reaction in an acid medium, e.g., concentrated sulfuric acid of a N-hydroxy alkyl lactam of the following structural formula

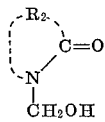

wherein $R_2$ has the above defined significance with an anthraquinone compound of the following formula:

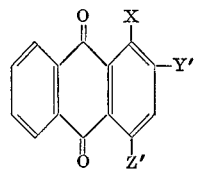

wherein X has the value previously described, Y' represents hydrogen, lower alkoxy or halogen and Z' represents hydrogen, —OH or —NHR with the proviso that at least one of Y' and Z' represents the grouping:

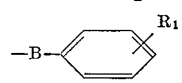

wherein B and $R_1$ have the above defined significance. The reaction may be carried out at temperatures ranging from about 15° C. to about 60° C., although slightly elevated temperatures preferably ranging from 50° C.–60° C. are found to be particularly effective for purposes of accelerating the reaction. The condensation reaction is desiredly effected in the presence of a solvent such as glacial acetic acid with the higher temperature reactions being preferably effected in the presence of a trace of strong mineral acid.

The lactam methylated dyestuff product may be isolated from the solvent medium by drowning the acid reaction media in water, whereupon the dyestuff product precipitates. The precipitated product is usually obtained in the form of small crystals which after filtering and washing with water until free of acid are obtained in the form of a wet cake. The cake can then be readily dispersed with approximately equal amounts of dispersing agent such as Blancol N (formaldehyde condensation product of naphthalene-sulfonic acid) or Marasperse B, N or CB (sodium lignin-sulfonate derivatives). Formation of the requisite dispersion may be effected by the use of the conventional commercial equipment promulgated for such purposes such as a Werner-Pfleiderer type mill or any other suitable apparatus which functions to triturate aggregate crystals as well as coating the individual crystal particles with the dispersing agent. After drying, e.g., vacuum oven, and grinding, e.g., hammer mill, the dispersed dyestuff is ready for application in dyeing processes.

The N-hydroxymethyl lactam derivative employed as the starting material, i.e., for reaction with the anthraquinone molecule may be readily and conveniently prepared by methylolation of the corresponding cyclic amides (lactams) for example by reaction with paraformaldehyde in the presence of an alkaline catalyst such as potassium hydroxide. Suitable preparatory methods in this regard are described in U.S. Patent No. 3,073,843.

EXAMPLE I

A one liter beaker with a stirrer and thermometer inserted and surrounded by a cooling bath was charged with 500 ml. 96% sulfuric acid (920 g., s.g. 1.84). At 15° C. to 20° C. there was gradually added 46.65 g. (0.15 mole) of 1-amino-2-phenoxy-4-hydroxyanthraquinone over a period of approximately two and one-half hours. The latter compound is prepared by the reaction of phenol with 1-amino-2-bromo-4-hydroxyanthraquinone, the latter being prepared by the treatment of 1-amino-2,4-dibromoanthraquinone with 10% oleum at 115° C.–120° C. in the presence of boric acid. After all of the dyestuff intermediate was dissolved with stirring, 51.75 g. (0.45 mole) N-hydroxymethylpyrrolidinone was slowly added after cooling the mixture to 5° C.–10° C. by an ice water bath. This addition required one-half hour. The mixture was allowed to warm up to room temperature and was stirred overnight. The temperature was then gradually raised to 50° C.–55° C. over one-half hour and held at this range for two hours. The reaction mixture was cooled to room temperature and drowned in a water/ice bath (4 liters) and after two hours stirring, was filtered and the cake washed with about a liter of water. Because of the rather slow filtration, it was difficult to wash the cake acid free, and thus the cake was reslurried in 500 ml. water and the residual acid was neutralized by the gradual addition of 23 g. sodium bicarbonate. The product was filtered and dried in a vacuum oven at 50° C. After drying, 66.7 g. of undispersed dyestuff was obtained. Fifty-five grams of this product was dispersed with 55 g. Tamol NNO (formaldehyde-naphthalene-sulfonic acid condensation product) for three hours in a Werner-Pfleiderer type dispersion mill. The product was dried in a vacuum oven at 55° C. After dispersion the product was ground in a hammer mill to very fine particle size. The dispersed dyestuff dyes Dacron a beautiful bright cerise color which has excellent fastness to sublimation, crocking and light. The dyestuff has the following structure:

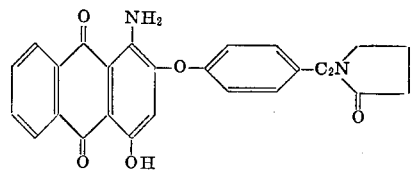

EXAMPLE II

A 400 ml. beaker equipped with a stirrer, thermometer and a water bath was charged with 100 ml. 96% sulfuric acid (184 g.; s.g. 1.84). 9.84 g. of 1-hydroxy-4-(p-toluidino)-anthraquinone was gradually added to the sulfuric acid which had been cooled to 10° C.–15° C. by an ice water bath. The foregoing compound is prepared by the reaction of 4-toluidine with 1,4-dihydroxyanthraquinone (quinizarin). The addition took twenty minutes. N-hydroxymethylpyrrolidinone (6.9 g.) was added during fifteen minutes at a temperature of 10° C.–15° C. The mixture was stirred overnight at room temperature and the next morning, the temperature was gradually raised to 50° C.–55° C. and held here for two hours. After cooling to room temperature, the reaction mixture was drowned in about 3 liters of an ice/water bath and stirred for three to four hours. The product was filtered, the cake washed with water until acid free, then dried in a vacuum oven at 60° C. The dried product weighed 12.2 g. After dispersion, the dyestuff dyed Dacron a bright reddish blue color having excellent fastness to sublimation and light. The dyestuff has the following structure:

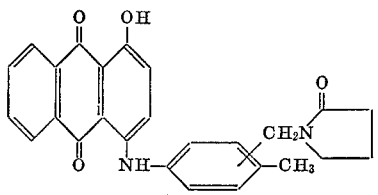

EXAMPLE III

A 400 ml. beaker equipped with a stirrer, thermometer and immersed in a water bath was charged with 100 ml. 96% sulfuric acid (184 g.; s.g. 1.84). 10.32 g. 1-hydroxy-4-(p-anisidino anthraquinone), prepared by the reaction of p-anisidine and quinizarin, was gradually added to the sulfuric acid which had been cooled to 0° C.–15° C. by an ice/water bath. The addition took twenty minutes. N-hydroxymethylpyrrolidinone (6.9 g.) was added during fifteen minutes with continual stirring. After stirring overnight, the mixture was warmed to 50° C.–55° C. and held at this temperature for two hours. The sulfuric acid solution of the methylolated dyestuff was cooled with an ice bath to room temperature and drowned in a water/ice bath (3 liters). The product was filtered, washed acid free with water, and dried at 60° C. in a vacuum oven. The dyestuff after proper dispersion, dyed Dacron a reddish blue shade which has excellent fastness to both sublimation and light. The starting material which also dyes Dacron has poor sublimation fastness. The dyestuff has the following chemical structure:

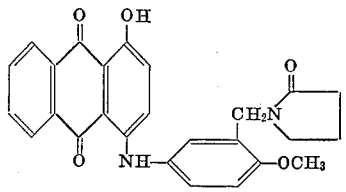

The present invention has been disclosed with respect to certain preferred embodiments thereof, and there will become obvious to persons skilled in the art various modifications, equivalents or variations thereof which are intended to be included within the spirit and scope of this invention.

What is claimed is:
1. A compound of the formula:

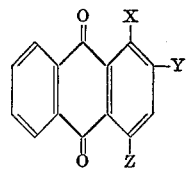

wherein X is selected from the group consisting of —NHR and —OH, wherein R represents hydrogen or lower alkyl containing 1 to 4 carbon atoms; Y is selected from the group consisting of hydrogen, lower alkoxy, halogen and the grouping

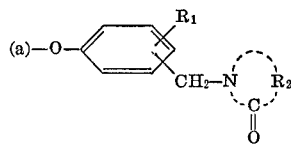

wherein $R_1$ is selected from the group consisting of hydrogen, lower alkyl and lower alkoxy and $R_2$ represents an alkylene radical of from 3 to 5 carbon atoms necessary to complete a 5 to 7 membered heterocycle of the lactam series and Z is selected from the group consisting of hydrogen, —OH, —NHR and the grouping (a) as above defined, at least one of Y and Z being represented by said grouping.

2. An anthraquinone dyestuff of the formula:

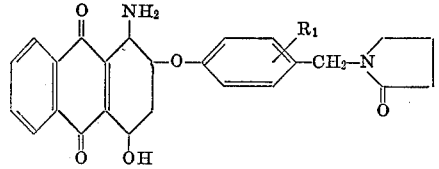

wherein $R_1$ is selected from the group consisting of hydrogen, lower alkyl and lower alkoxy.

3. The process which comprises reacting in acid media an N-hydroxymethyl lactam of the formula:

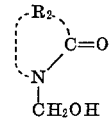

wherein $R_2$ represents an alkylene radical having the carbon atoms necessary to complete a 5 to 7 membered heterocycle of the lactam series with an anthraquinone compound of the formula:

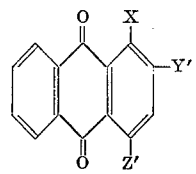

wherein X is selected from the group consisting of —NHR and —OH wherein R represents hydrogen or lower alkyl of from 1 to 4 carbon atoms, Y' is selected from the group consisting of hydrogen, lower alkoxy, halogen and the grouping

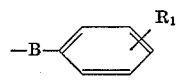

wherein B is selected from the group consisting of —O— and

$R_1$ is selected from the group consisting of hydrogen, lower alkyl and lower alkoxy and Z' is selected from the group consisting of hydrogen, —OH, —NHR and the grouping

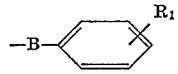

wherein at least one of Y' and Z' represents the grouping:

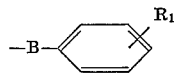

wherein B and $R_1$ have the aforedefined significance, said reaction being carried out under temperatures ranging from about 15° C. to 60° C.

References Cited

UNITED STATES PATENTS 2,615,021   10/1952   Randall et al.
3,279,880   10/1966   Straley et al. _____ 260—377

HENRY R. JILES, Primary Examiner
R. T. BOND, Assistant Examiner

U.S. Cl. X.R.

8—21, 39; 260—239.3, 294.7, 377, 380